(12) United States Patent
Sato

(10) Patent No.: US 6,644,433 B2
(45) Date of Patent: Nov. 11, 2003

(54) CONTROL APPARATUS FOR CONTROLLING AN ELECTRIC POWER STEERING MECHANISM

(75) Inventor: Atsushi Sato, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/006,211

(22) Filed: Dec. 10, 2001

(65) Prior Publication Data

US 2002/0070072 A1 Jun. 13, 2002

(30) Foreign Application Priority Data

Dec. 13, 2000 (JP) ........................................ 2000-378475

(51) Int. Cl.$^7$ ................................................ B62D 5/04
(52) U.S. Cl. ............................ 180/446; 701/41; 701/42
(58) Field of Search ................................ 180/404, 446; 701/41, 42, 43

(56) References Cited

U.S. PATENT DOCUMENTS

| | | | | |
|---|---|---|---|---|
| 5,720,361 A | | 2/1998 | Nishimoto et al. | 180/446 |
| 5,765,661 A | * | 6/1998 | Matsuoka | 180/446 |
| 5,828,973 A | * | 10/1998 | Takeuchi et al. | 180/412 |
| 5,845,738 A | * | 12/1998 | Nishino et al. | 180/443 |
| 5,889,376 A | * | 3/1999 | Takatsuka et al. | 180/446 |
| 5,999,869 A | | 12/1999 | Nishimoto et al. | 701/41 |
| 6,008,599 A | * | 12/1999 | Beck | 180/446 |
| 6,018,691 A | * | 1/2000 | Yamamoto et al. | 180/404 |
| 6,029,767 A | * | 2/2000 | Kifuku | 180/443 |
| 6,041,884 A | * | 3/2000 | Shimizu et al. | 180/443 |
| 6,070,692 A | * | 6/2000 | Nishino et al. | 180/443 |

FOREIGN PATENT DOCUMENTS

| JP | A-9-11920 | 1/1997 |
|---|---|---|
| JP | A-10-244950 | 9/1998 |

\* cited by examiner

*Primary Examiner*—Lesley D. Morris
*Assistant Examiner*—L. Lum
(74) *Attorney, Agent, or Firm*—Posz & Bethards, PLC

(57) ABSTRACT

A control apparatus for controlling an electric power steering mechanism including an abnormal detecting unit for detecting abnormality or normality of the electric power steering mechanism for each sampling time; and a failure deciding unit for detecting failure of the electric power steering mechanism when an abnormal counter is incremented at every detection of abnormality detected by the abnormal detecting unit, and when the abnormality counter reaches a failure deciding value, wherein, the failure deciding unit returns the abnormal counter from its held value to zero when the abnormal detecting unit sequentially detects normality during a predetermined sampling times, even if the abnormal detecting unit once detects abnormality, whereby it can be surely determined whether or not the electric power steering mechanism has failed.

5 Claims, 5 Drawing Sheets

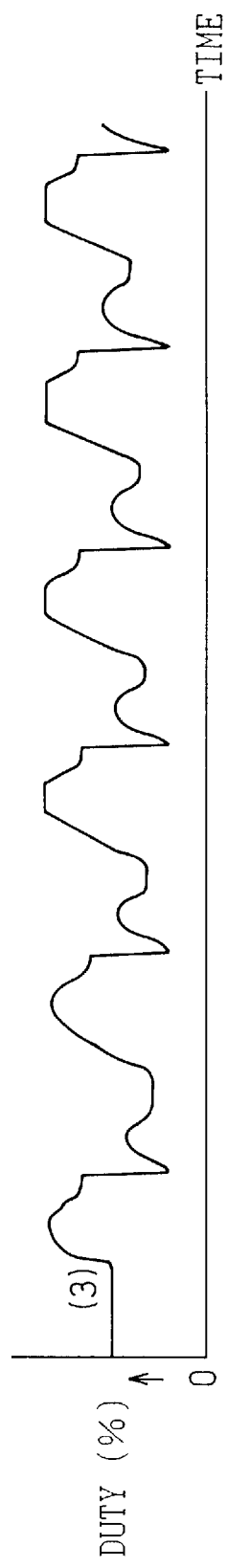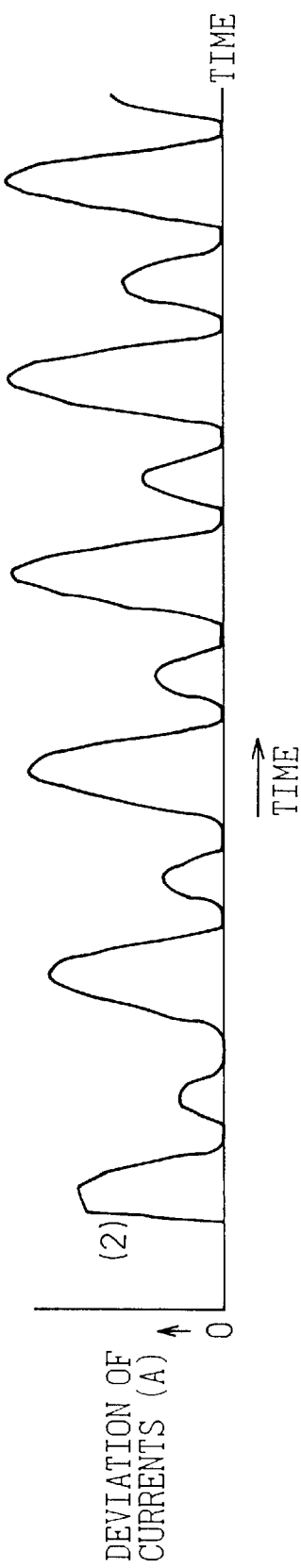

CONTROL APPARATUS FOR CONTROLLING AN ELECTRIC POWER STEERING MECHANISM

BACKGROUND OF THE INVENTION

1. Field of the Invention

The present invention relates to a control apparatus for controlling an electric power steering mechanism.

2. Description of the Related Art

Two documents have been disclosed regarding an electric power steering mechanism. One is U.S. Pat. No. 5,720,361, and the other is U.S. Pat. No. 5,999,869. In these documents, an abnormality-detecting circuit for determining a failure of the electric power steering mechanism is disclosed.

According to the prior art, an abnormality detecting counter (hereinafter referred to as an abnormal counter) counts up each time an abnormality of the electric power steering mechanism is detected, and when the count value reaches a failure deciding value, a CPU decides that the power steering mechanism driven by an electric motor is in a state of a failure and the current supplied to the electric motor is stopped.

However, when the abnormal counter cannot detect an abnormality before it reaches the failure determining value, the CPU immediately decides that the electric power steering mechanism is normal and the abnormal counter is reset to zero.

The above-described prior art has the following problems.

According to the above-mentioned logic to detect a failure, a failure state can be determined as long as the detection of abnormality due to a failure continues. However, when the abnormality is in a driving circuit system for the electric power steering mechanism (such as a short circuit between a motor terminal and a battery line, a short circuit between the motor terminal and a ground line, a short circuit between motor terminals, or a failure of the motor current detecting circuit), the current, and thus the steering torque value, hunts due the presence of the control system or the steering system, so that the abnormality is not continuously detected even though the abnormality continues in the driving circuit system. In such a case, a failure of the electric power steering system cannot be surely determined.

SUMMARY OF THE INVENTION

Accordingly, an object of the present invention is to provide a control apparatus of an electric power steering mechanism, which can surely determine whether or not the power steering mechanism is in a failure state.

To attain the above object, according to a first aspect of the present invention, there is provided a control apparatus for controlling an electric power steering mechanism comprising:

a torque sensor mounted on a steering shaft for detecting a steering torque signal;

an indicating value calculating unit for calculating a motor current indicating value based on the steering toque signal detected by the torque sensor and a vehicle speed detected by a vehicle speed sensor;

an electric motor for providing a steering assist force to the steering shaft;

a motor current detecting unit for detecting a motor current flowing in the electric motor;

a motor drive circuit for driving the electric motor;

a drive signal calculating circuit for calculating a drive signal from a current deviation between the motor current indicating value and the motor current detected value, and transferring the drive signal to the motor drive circuit;

an abnormal detecting unit for detecting whether the electric power steering mechanism is abnormal or normal at each sampling time; and a failure deciding unit for detecting failure of the electric power steering mechanism when an abnormal counter is incremented at every detection of abnormality detected by the abnormal detecting unit, and when the abnormality counter reaches a failure deciding value;

wherein, the failure deciding unit returns the count value of the abnormal counter from the held value to zero when the abnormal detecting unit sequentially detects normality during a predetermined number of sampling times, even if the abnormal detecting unit once detects abnormality.

According to the above construction, even when the driving circuit system in the electric power steering mechanism is in a failure state, the abnormal counter is not reset too early but is continuously incremented.

When the count value of the abnormality counter reaches a failure deciding value, the failure-deciding unit determines that the electric power steering mechanism is in a failure state.

In addition, even when the abnormal detecting unit once detects abnormality, the failure-deciding unit resets the abnormal counter to zero only after the abnormal detecting unit sequentially detects normality during a predetermined number of sampling times. As a result, an erroneous decision, of deciding too early that the electric power steering system is in a failure state, can be prevented.

As a result, according to the first aspect of the present invention, it can be surely determined whether or not the electric power steering mechanism is in a failure state.

According to a second aspect of the present invention, the abnormal detecting unit has a hysteresis characteristic in order to detect whether the electric power steering mechanism is abnormal or normal. The abnormal detecting unit detects, at each sampling time, whether the electric power steering mechanism is abnormal or normal. When the abnormal detecting unit detects an abnormal state, the abnormal counter is incremented.

After the abnormal detecting unit detects an abnormal state, when the abnormal detecting unit detects a normal state or an indefinite state, which is neither abnormal nor normal, the abnormal counter holds its count value.

By this second aspect of the present invention, even when the electric power steering mechanism is in a failure state or has a high possibility of failure, the abnormal counter is not reset too early but surely counts up even after the abnormal detecting unit detects a normal state or an indefinite state.

According to a third aspect of the present invention, the abnormal detecting unit detects whether the electric power steering mechanism is normal or abnormal, based on at least one of a detected value of the motor current, a detected value of the motor voltage, a detected value of the battery voltage, and the motor current indicating value.

By this third aspect, the abnormal detecting unit can detect, with high precision, whether the electric power steering mechanism is normal or abnormal.

According to a fourth aspect of the present invention, the abnormal detecting unit detects that the electric power steering mechanism is normal under conditions where the detected value of the motor current is included within a normal range, where the detected value of the motor voltage is included within a normal range, where the detected value of the battery voltage is included within a normal range, and where the motor current indicating value is included within a normal range.

The abnormal detecting unit detects that the electric power steering mechanism is abnormal under the condition where the detected value of the motor current is not included within the normal range, where the detected value of the motor voltage is not included within the normal range, where the detected value of the battery voltage is not included within the normal range, or where the motor current indicating value is not included within the normal range.

By this fourth aspect of the present invention, the abnormal detecting unit can detect, with a high precision, whether the electric power steering mechanism is normal or abnormal.

According to a fifth aspect of the present invention, the control apparatus for controlling the electric power steering mechanism includes means for setting, when the abnormal detecting unit sequentially detects normality after the abnormal detecting unit once detects abnormality, a time required for sampling times to return the count value, counted by the abnormal counter from a holding value to zero, to a period longer than a hunting period which occurs in a control system and a steering system.

By this fifth aspect, a failure of the electric power steering mechanism, which is the hunting of the steering shaft caused due to the presence of the control system and the steering system, can also be determined as a failure.

BRIEF DESCRIPTION OF THE DRAWINGS

The above object and features of the present invention will be more clearly understood from the following description of the preferred embodiments when read with reference to the accompanying drawings, wherein:

FIGS. 2A–2C are views for explaining waveforms in the hunting state of a steering shaft when a failure occurs in a motor current detecting unit.

DESCRIPTION OF THE PREFERRED EMBODIMENTS

The preferred embodiments according to the present invention will be explained in detail with reference to the attached drawings.

Figure 1:
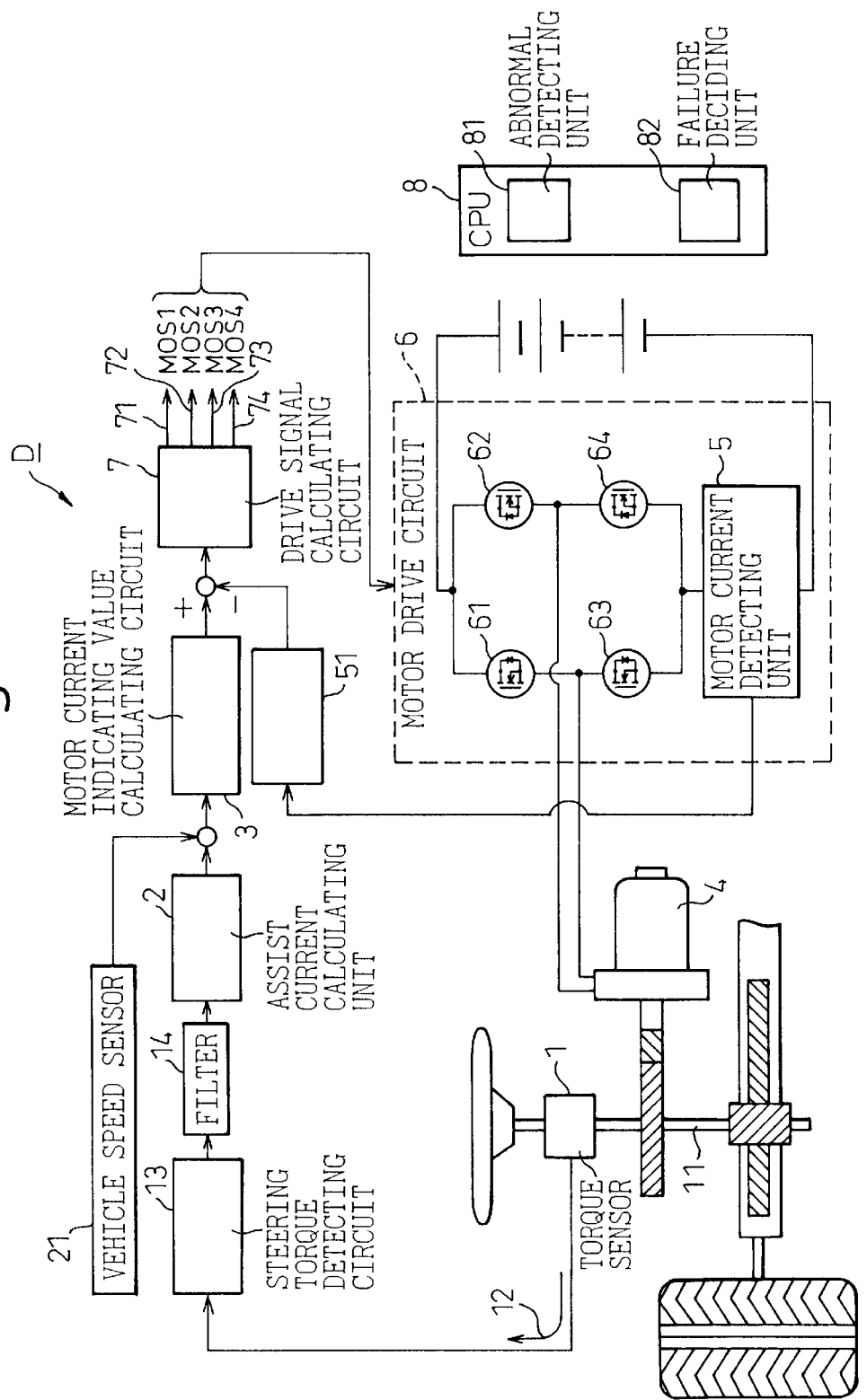
FIG. 1 is a block diagram of a control apparatus for controlling an electric power steering mechanism, according to an embodiment of the present invention.

In FIG. 1, a control apparatus D for controlling an electric power steering mechanism includes a torque sensor 1, an assist current calculating unit 2, a motor current indicating value calculating unit 3, an electric motor 4, a motor current detecting unit 5, a motor drive circuit 6, a drive signal calculating circuit 7, and a central processing unit (CPU) 8 having an abnormal detecting unit 81 and a failure deciding unit 82.

Further, the torque sensor 1 is mounted on a steering shaft 11 and is provided for detecting a steering torque signal 12.

The assist current calculating unit 2 is provided for calculating the assist current in response to the steering torque, based on the steering torque signal processed by a steering torque detecting circuit 13 and a filter 14.

The motor current indicating value calculating unit 3 is provided for calculating an indicating value for determining motor current, based on the assist current calculated by the assist current calculating unit 2 and vehicle speed detected by a vehicle speed sensor 21. In this case, the indicating value for determining motor current is determined in such a way that a driver has a preferable feeling of response when he operates the steering wheel upon driving the vehicle. That is, the motion of the steering wheel is adjusted based on the assist current and the vehicle speed so as to supply a preferable feeling to the driver.

A rotational axis of the motor 4 is coupled to the steering shaft 11 through a reduction gear mechanism (not shown) so that it is possible to apply a steering-assist force to the steering shaft 11.

The motor current detecting unit 5 is provided for detecting motor current flowing in the electric motor 4 based on a motor current detecting value 51.

The motor drive circuit 6 is formed by four power MOS-FETs 61 to 64 and CR parts (not shown) in order to drive the motor 4.

The drive signal calculating circuit 7 is provided for obtaining the drive signal, based on a current deviation between the motor current indicating value, calculated by the motor current indicating value calculating unit 3, and the motor current detecting value 51 detected by the motor current detecting unit 5. Further, the drive signal calculating circuit 7 transmits driving duty ratio signals 71 to 74 to the motor drive circuit 6 in order to drive the power MOS-FETs 61 to 64.

In this case, the direction of drive of each of the power MOS-FETs 61 to 64 is determined based on a plus/minus sign of the drive torque or the motor current indicating value. For example, when the driver operates the steering wheel in the right direction, the power MOSFETs 61 and 64 are driven by the duty controlled signals. On the other hand, when the driver operates the steering wheel in the left direction, the power MOS-FETs 62 and 63 are driven by the duty controlled signals. Accordingly, it is possible to execute assist operation in accordance with the operational direction of the steering wheel.

The abnormal detecting unit 81 in the CPU 8 detects whether the electric power steering mechanism is abnormal, or normal, at each sampling time (sampling period: 4 ms) of the CPU 8, in accordance with whether an abnormality-detecting condition or a normality-detecting condition is satisfied.

The failure-deciding unit 82 executes a failure decision in accordance with the following processes.

When the abnormal detecting unit 81 detects abnormality, i.e., when abnormality-detecting condition, which will be described later in more detail, is satisfied, a normal counter for counting the number of normal states is reset to zero, and an abnormal counter for counting the number of abnormal states is incremented at each detection of abnormality.

When the abnormal detecting unit 81 detects normality, i.e., when normality detecting condition (which will be described later in more detail) is satisfied within a period after a detection of abnormality, for example, within a period in which the count value of the abnormal counter satisfies a condition: one time $\leq$ count value of the abnormal counter $\leq$ fifty times, the count value of the abnormal counter is held. The normal counter is incremented each time at a detection of normality.

When the abnormal detecting unit 81 detects an indefinite state which is not only a normal state, but is also an abnormal state, i.e., when both of normality detecting condition and abnormality detecting condition are not satisfied within a period after detection of abnormality, for example, within a period in which the count value of the abnormal counter satisfies a condition: one time$\leq$count value of the abnormal counter$\leq$fifty times, the count value of the abnormal counter is held, and the count value of the normal counter is either held, or reset to zero.

Only after the count value of the normal counter exceeds a predetermined number such as one hundred times (i.e., the count value of the normal counter$\leq$100), is the abnormal counter reset to zero. In contrast, in the prior art, the abnormal counter is reset immediately after the abnormal counter does not count an abnormality. It should be noted that a period required for the number of samples to return the count value held in the abnormal counter to zero (when the sampling period of the CPU 8 is 4 ms, the period is 4(ms)×100 times=400 ms), is longer than a hunting period due to the presence of the control system and the steering system.

When the count value of the abnormal counter reaches a failure deciding value 50 times (for example, 200 ms when the sampling period the CPU is 4 ms, that is, 4(ms)×50 times=200 ms), the CPU 8 determines that the electric power steering mechanism is in a failure state, and informs the failure by using a display or the like. Further, the current to be supplied to the motor 4 is cut off.

An example of the abnormality detecting condition must satisfy the following three conditions.

Detected motor current value<1 A, and

Indicated motor current>1 A, and

Detected voltage between motor terminal>2 V

An example of the normality detecting condition must satisfy the following condition.

Detected motor current value$\leq$1 A

Figure 2A:
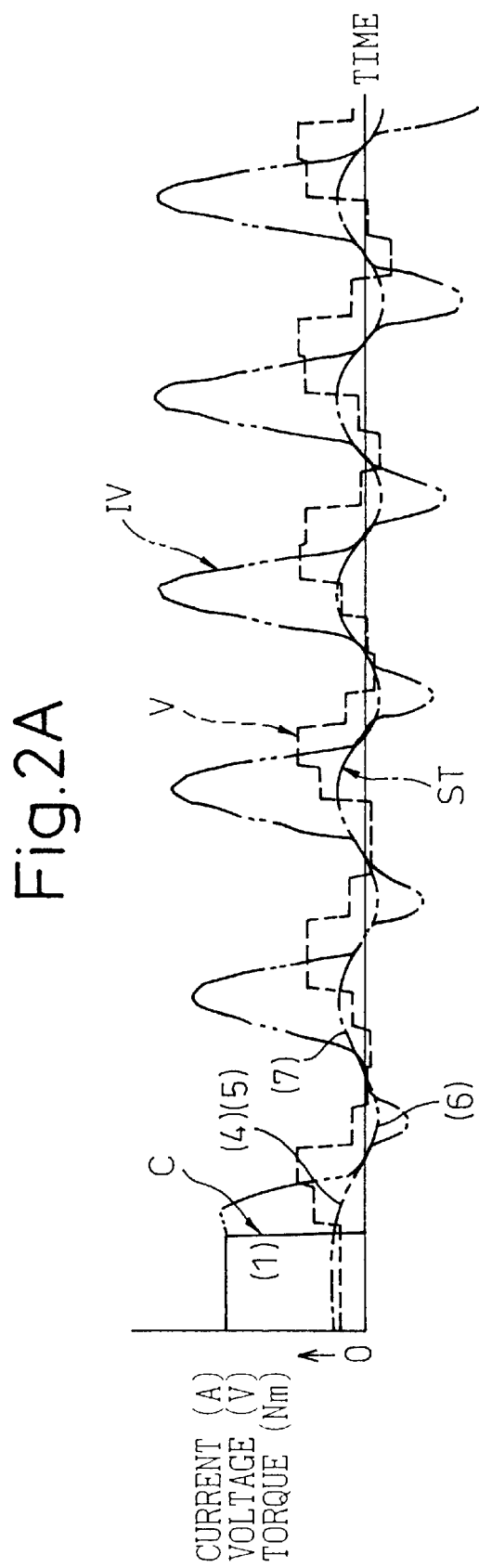

For example, when the motor current detecting unit 5 is out of order, and when the motor current detecting value is 0 ampere (A), the hunting state of the steering shaft 11 occurs in accordance with actions of the following seven steps (1)–(7) and as shown in FIGS. 2A–2C.

(1) The motor current detecting value 51 is turned to 0 ampere (A).

(2) The deviation between the motor current indicating value and the motor current detecting value 51 is large.

(3) The driving duty ratios in the duty signals 71 to 74 of the power MOS-FETs 61 to 64 are increased.

(4) The current (not shown in FIGS. 2A–2C) actually flowing through the motor is increased so that the steering shaft 11 is driven to rotate by the motor 4, resulting in the steering torque ST beginning to decrease.

(5) The torque sensor 1 is twisted to the direction opposite to the steering direction, and the direction of the steering torque ST is changed.

(6) The driving directions of the power MOS-FETs 61 to 64 are changed and, therefore, the direction of the current actually flowing through the motor is reversed.

(7) The direction of the steering torque ST is changed again (i.e. original direction of torque) from the above step (5).

Figure 3A:
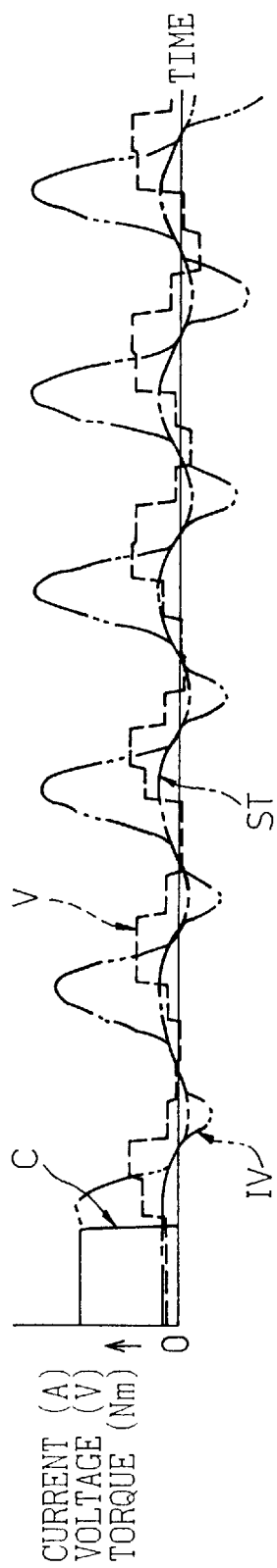
FIGS. 3A–3D are views for explaining waveforms in the changing state of abnormal counter values at the present invention and the prior art, when failure occurs in the motor current detecting unit.
Figure 3B:
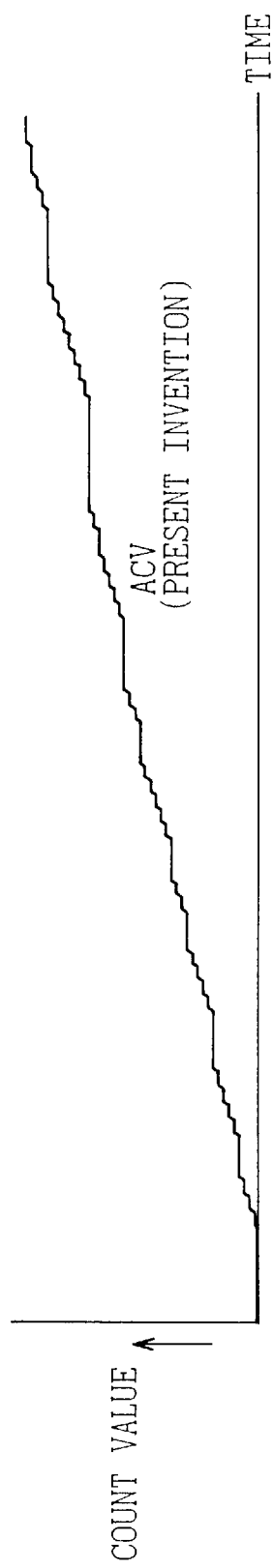
Figure 3C:
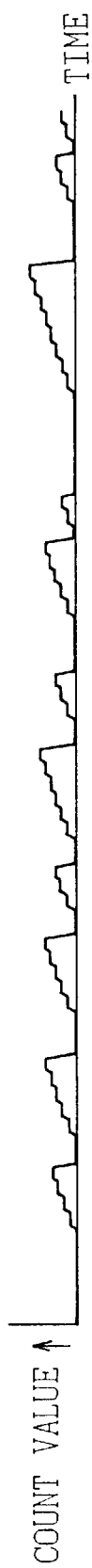
Figure 3D:
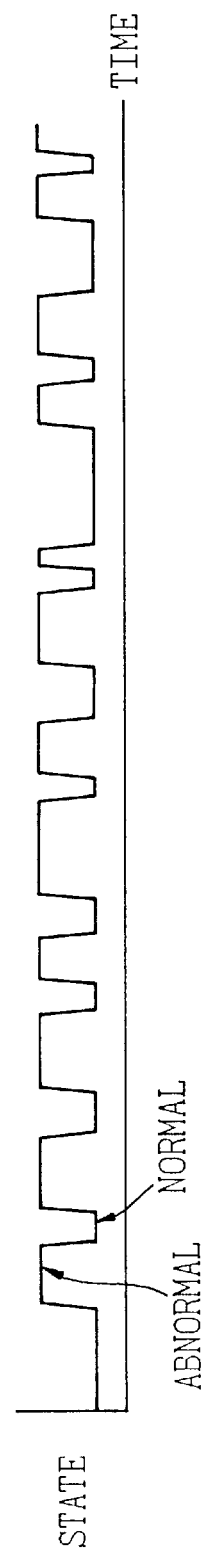

For the above failure in which the actual flowing current is hunting so that the steering torque ST is hunting, in the prior art, when the abnormality is not detected before the abnormal counter reaches the failure deciding value, the state of the electric power steering mechanism is determined to be normal (see FIG. 3D) so that the abnormal counter is reset (see FIG. 3C).

In contrast, according to the embodiment of the present invention, the control apparatus D of the electric power steering mechanism holds the count value of the abnormal counter when the abnormal detecting unit 81 detects normality or an indefinite state after detection of abnormality (for example, one time$\leq$the count value of the abnormal counter$\leq$fifty times). Next, when the control apparatus D detects abnormality, that is when the abnormality detecting condition is satisfied, the abnormal counter is incremented from the holding value at every detection of abnormality (see FIG. 3B).

Accordingly, it is possible to surely detect the failure of the electric power steering mechanism, even if the driving circuit system in the electric power steering mechanism is abnormal and even if the hunting state of the steering shaft 11 occurs due to the presence of the control system and the steering system.

According to another embodiment of the present invention, the abnormal detecting unit 81 detects normality of the electric power steering mechanism when the detected value of the motor current 51 is included within a first normal range, when the detected value of the motor voltage is included within a second normal range, when the detected value of the battery voltage is included within a third normal range, and when the motor current indicating value is included within a fourth normal range.

On the other hand, the abnormal detecting unit 81 detects abnormality of the electric power steering mechanism when the detected value of the motor current 51 is not included within the first normal range, when the detected value of the motor voltage is not included within the second normal range, when the detected value of the battery voltage is not included within the third normal range, or when the motor current indicating value is not included within the fourth normal range.

What is claimed is:

1. A control apparatus for controlling an electric power steering mechanism comprising:

a torque sensor mounted on a steering shaft for detecting a steering torque signal;

an indicating value calculating unit for calculating a motor current indicating value based on the steering torque signal detected by the torque sensor and a vehicle speed detected by a vehicle speed sensor;

an electric motor for providing a steering assist force to the steering shaft;

a motor current detecting unit for detecting a motor current flowing in the electric motor;

a motor drive circuit for driving the electric motor;

a drive signal calculating circuit for calculating a drive signal from current deviation between the motor current indicating value and the motor current detected value, and transferring the drive signal to the motor drive circuit;

an abnormal state detecting unit for detecting whether the electric power steering mechanism is in an abnormal state or a normal state for each of a plurality of sampling times, wherein a count value of an abnormality counter is incremented at every detection of the abnormal state that is detected by the abnormal state detecting unit; and a failure deciding unit for detecting failure of the electric power steering mechanism when the abnormality counter reaches a failure deciding value, wherein the failure deciding unit returns the count value of the abnormality counter to zero when the abnormal state detecting unit sequentially detects normality during a predetermined number of the sampling times, even if the abnormal state detecting unit once detects abnormality.

2. A control apparatus as claimed in claim 1, wherein the abnormal state detecting unit has a hysteresis characteristic in order to detect whether the electric power steering mechanism is in the abnormal state or is in the normal state, and when the abnormal state detecting unit detects an indefinite state, which is not the abnormal state and is not the normal state, the count value in the abnormality counter is held.

3. A control apparatus as claimed in claim 1, wherein the abnormal state detecting unit detects a state of the electric power steering mechanism, based on at least one or more data of a detected value of the motor current, a detected value of the motor voltage, a detected value of the battery voltage, or the motor current indicating value.

4. A control apparatus as claimed in claim 1, wherein the abnormal state detecting unit detects normality of the electric power steering mechanism when the detected value of the motor current is included within a first normal range, when the detected value of the motor voltage is included within a second normal range, when the detected value of the battery voltage is included within a third normal range, and when the motor current indicating value is included within a fourth normal range; and wherein the abnormal state detecting unit detects abnormality of the electric power steering mechanism when the detected value of the motor current is not included within the first normal range, when the detected value of the motor voltage is not included within the second normal range, when the detected value of the battery voltage is not included within the third normal range, or when the motor current indicating value is not included within the fourth normal range.

5. A control apparatus as claimed in claim 1, further comprising a means for setting the predetermined number of sampling times to correspond to a period longer than a hunting period of the control apparatus.

* * * * *